(12) United States Patent
Newman et al.

(10) Patent No.: US 8,978,685 B2
(45) Date of Patent: Mar. 17, 2015

(54) VALVE ASSEMBLY FOR COMPRESSED AIR CARTRIDGE

(71) Applicants: Shmuel Dovid Newman, Redondo Beach, CA (US); Jeffery Brown, North Logan, UT (US)

(72) Inventors: Shmuel Dovid Newman, Redondo Beach, CA (US); Jeffery Brown, North Logan, UT (US)

(73) Assignee: Conair Corporation, Stamford, CT (US)

( * ) Notice: Subject to any disclaimer, the term of this patent is extended or adjusted under 35 U.S.C. 154(b) by 14 days.

(21) Appl. No.: 13/760,245

(22) Filed: Feb. 6, 2013

(65) Prior Publication Data

US 2013/0213492 A1 Aug. 22, 2013

Related U.S. Application Data

(60) Provisional application No. 61/596,486, filed on Feb. 8, 2012.

(51) Int. Cl.
| | |
|---|---|
| F16K 1/16 | (2006.01) |
| F16K 17/40 | (2006.01) |
| F16K 17/04 | (2006.01) |
| F16K 1/30 | (2006.01) |

(52) U.S. Cl.
CPC ............ *F16K 17/40* (2013.01); *F16K 17/04* (2013.01); *F16K 1/306* (2013.01); *F16K 17/403* (2013.01)
USPC ............... 137/68.19; 137/540; 137/596.12

(58) Field of Classification Search
USPC ............ 137/68.19, 68.23, 71, 540, 541, 512, 137/596.12
See application file for complete search history.

(56) References Cited

U.S. PATENT DOCUMENTS

| | | | | |
|---|---|---|---|---|
| 2,524,052 | A * | 10/1950 | Grant, Jr. ..................... 137/596 |
| 3,580,275 | A * | 5/1971 | Hanson et al. ........... 137/516.29 |
| 4,363,424 | A * | 12/1982 | Holben et al. ................... 222/4 |
| 4,842,004 | A * | 6/1989 | Steinman .................. 137/68.19 |
| 5,778,875 | A * | 7/1998 | Morgan et al. .......... 128/204.26 |

* cited by examiner

*Primary Examiner* — Kevin Lee
*Assistant Examiner* — P. Macade Nichols
(74) *Attorney, Agent, or Firm* — McCormick, Paulding & Huber LLP

(57) ABSTRACT

A valve assembly in accordance with the present invention includes a head portion and a body portion. A throughbore extends through both the head portion and the body portion. A normal fluid flow path is formed within the valve assembly to provide for the controlled exit of a fluid. The valve assembly also includes an automatic pressure-relieving mechanism. The pressure-relieving mechanism includes a disc designed to burst or rupture at a predetermined pressure and an overpressure fluid flow path for controlling the egress of overpressure fluid.

8 Claims, 5 Drawing Sheets

VALVE ASSEMBLY FOR COMPRESSED AIR CARTRIDGE

CROSS-REFERENCE TO RELATED APPLICATIONS

This application claims the benefit of U.S. Provisional Application Ser. No. 61/596,486, filed on Feb. 8, 2012, which is herein incorporated by reference in its entirety.

FIELD OF THE INVENTION

The present invention relates generally to devices for controlling the flow of fluids and, more particularly, to a valve assembly for controlling the flow of compressed air from a compressed air cartridge.

BACKGROUND OF THE INVENTION

Various devices exist for controlling the flow of fluids, such as compressed air or gas. Moreover, various devices exist specifically for the purpose of controlling the flow of compressed air, such as $CO_2$, from a compressed air cartridge. An example of such a device is a standard valve assembly that is located within the neck of a compressed air cartridge designed for use with carbonated beverage making appliances, $CO_2$ powered air guns, bicycle tire inflators, etc. With known valve assemblies, a pin on the device on which the cartridge is attached actuates the valve assembly within the cartridge in order to initiate the flow of compressed gas from the cartridge.

While existing devices for controlling the flow of fluids such as compressed gas are generally suitable for what is regarded as ordinary performance, there is room for improvement in terms of safety and overall design.

SUMMARY OF THE INVENTION

It is an object of the present invention to provide a valve assembly for controlling the flow of fluids.

It is another object of the present invention to provide a valve assembly for controlling the flow of pressurized gas from a compressed air cartridge.

It is another object of the present invention to provide a valve assembly that is easy to install within the neck of a compressed air cartridge.

It is another object of the present invention to provide a valve assembly configured to prevent and handle potential excess pressure buildup within a compressed air cartridge.

It is another object of the present invention to provide a valve assembly having an improved normal flow path and an over-pressure flow path.

These and other objects are achieved by the present invention.

A valve assembly in accordance with the present invention includes a head portion and a body portion. A throughbore extends through both the head portion and the body portion. A normal fluid flow path is formed within the valve assembly to provide for the controlled exit of a fluid. The valve assembly also includes an automatic pressure-relieving mechanism. The pressure-relieving mechanism includes a disc designed to burst or rupture at a predetermined pressure and an over-pressure fluid flow path for controlling the egress of over-pressure fluid.

BRIEF DESCRIPTION OF THE DRAWINGS

The present invention will be better understood from reading the following description of non-limiting embodiments, with reference to the attached drawings, wherein below.

DETAILED DESCRIPTION OF THE PREFERRED EMBODIMENT

Figure 1:
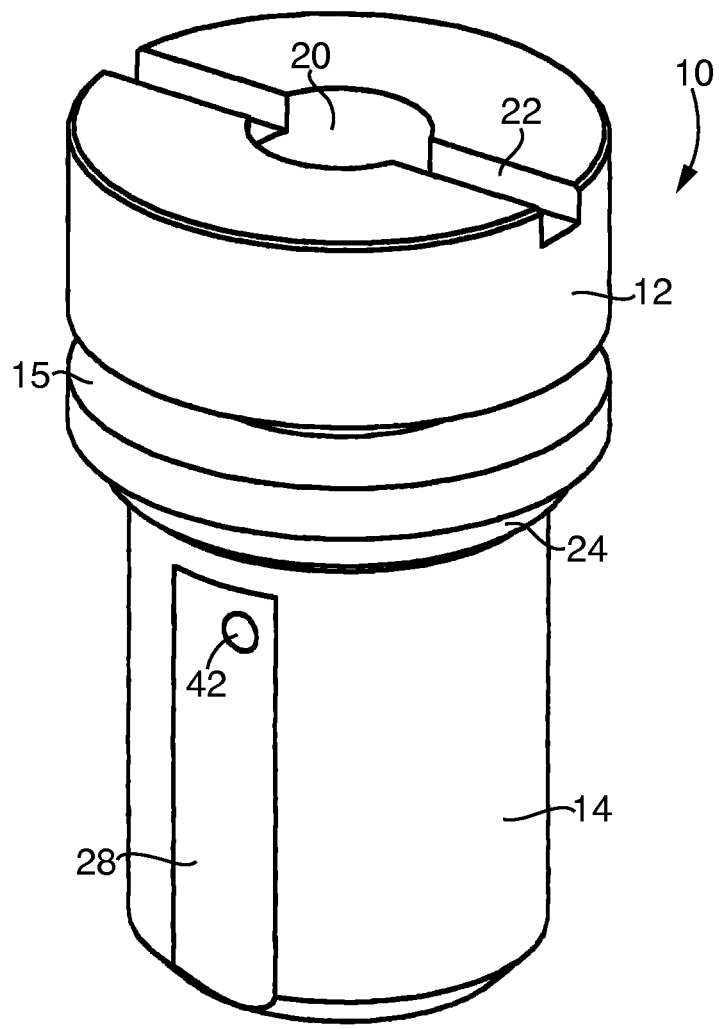
FIG. 1 is a perspective view of a valve assembly according to an embodiment of the present invention.

With reference to the drawings, a valve assembly for controlling the flow of a fluid is shown generally at 10. The valve assembly 10 includes an enlarged, cylindrically-shaped head portion 12 and a cylindrically shaped body portion 14 integrally formed therewith. The head portion 12 has a circumferential groove 15 formed therein. The body portion 14 is preferably formed with a plurality of threads (not shown) for engaging a plurality of complimentary threads formed in the neck 16 of a compressed air cartridge 18.

As further shown in FIG. 1, the valve assembly 10 has a throughbore 20 that extends axially through the center of the head portion 12 and through the body portion 14. In addition, the head portion 12 includes an upwardly facing groove 22. As will be readily appreciated, the groove 22 is preferably sized to accommodate a flat-head screwdriver or the like so that the valve assembly 10 may be easily and quickly threaded into the neck 16 of a compressed air cartridge 18. A seal ring 24 is provided between the enlarged head portion 12 and the body portion 14 and is designed to engage a shoulder 26 of the neck 16 of the bottle 18 to prevent the escape of compressed air from the cartridge 18. As best shown in FIG. 1, the valve assembly also includes a pair of vertically extending blood grooves 28 on opposing sides of the body portion 14.

Figure 2:
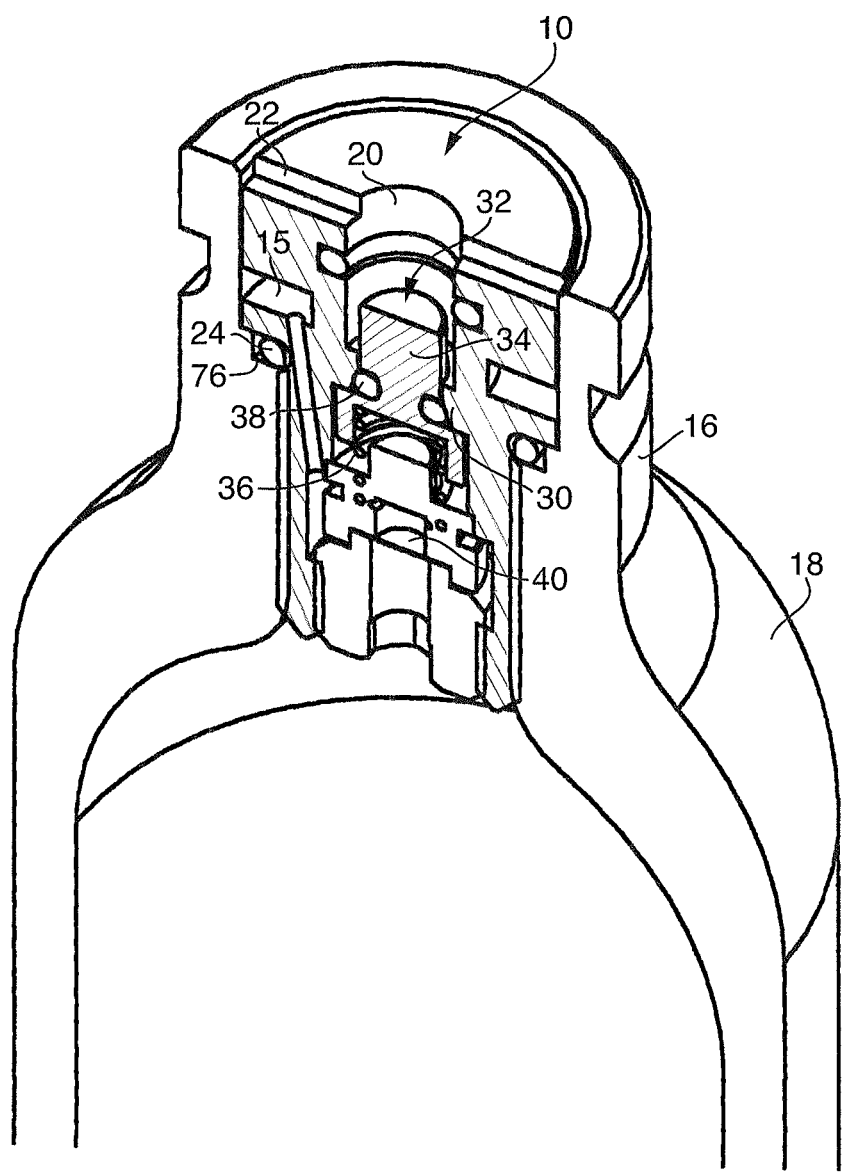
FIG. 2 is a cross-sectional, perspective view of the valve assembly of FIG. installed in the neck of a compressed air cartridge.

With reference to FIG. 2, the internal construction of the valve assembly 10 is shown. As shown therein, the throughbore 20 extends entirely through the valve assembly 10 and has a tapered section 30. A poppet 32 having a stem 34, a spring 36 and a seal ring 38 is positioned within the throughbore 20. In particular, as shown in FIG. 2, the poppet 32 is biased by the spring force such that the seal ring 38 is pressed against the tapered section 30 of the throughbore 20 to prevent the escape of compressed air from the cartridge 18. The poppet 32 is movable downward, against the force of the spring bias, to disengage the seal ring 38 from the transition section 32 to allow compressed air to escape from the cartridge 18, as discussed below. As further shown in FIG. 2, a burst disc 40 is sandwiched between two components below the poppet 32 and extends perpendicularly across the throughbore 20.

Figure 4:
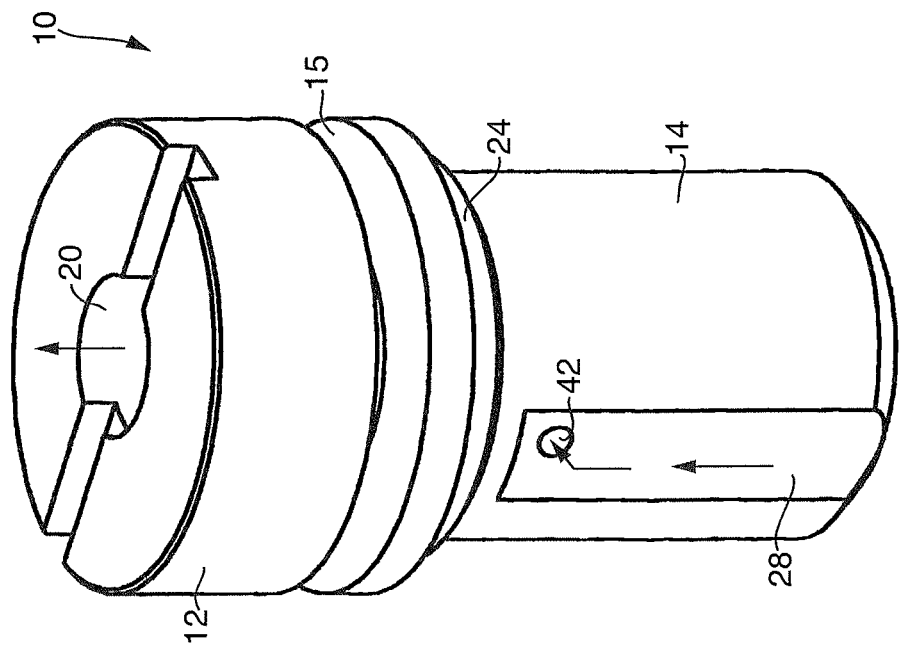
FIG. 4 is a perspective view of the valve assembly of FIG. 1, illustrating the normal fluid flow path.
Figure 3:
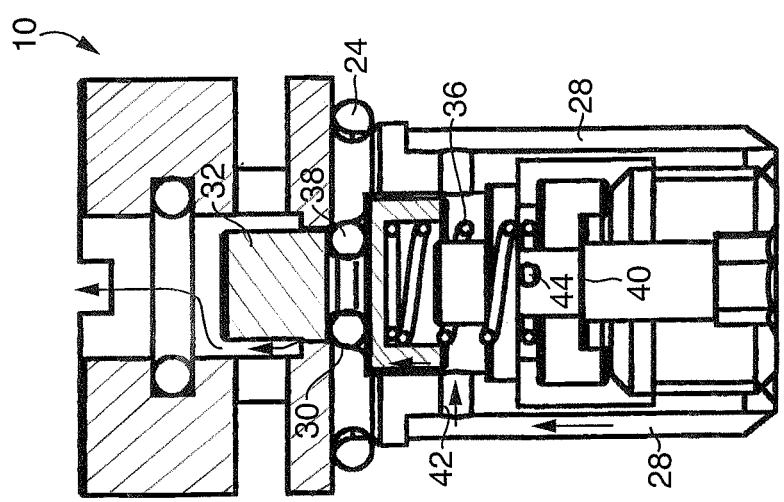
FIG. 3 is a cross-sectional, left side view of the valve assembly of FIG. 1, illustrating a normal fluid flow path.

Turning now to FIGS. 3 and 4, a normal fluid flow path is illustrated by the arrows. As shown therein, compressed air from the cartridge 18 flows into the blood grooves 28, which are formed as concave relieved areas in the sidewalls of the body portion 14. The compressed air is then permitted to flow into the interior of the valve assembly 10 through radial apertures 42 in the blood grooves 28, and fills up the space surrounding spring 36. In its "closed" state, the seal ring 38 of the poppet 32 is pressed up against tapered section 30 by the bias force of the spring 36 to prevent the compressed air from exiting from the neck 16 of the cartridge 18. Upon depression of the poppet stem 34, however, the seal ring 38 is moved out of engagement with the transition section 32 so that the compressed air may flow through the throughbore 20 and out of the cartridge 18, as illustrated by the arrows.

Figure 5:
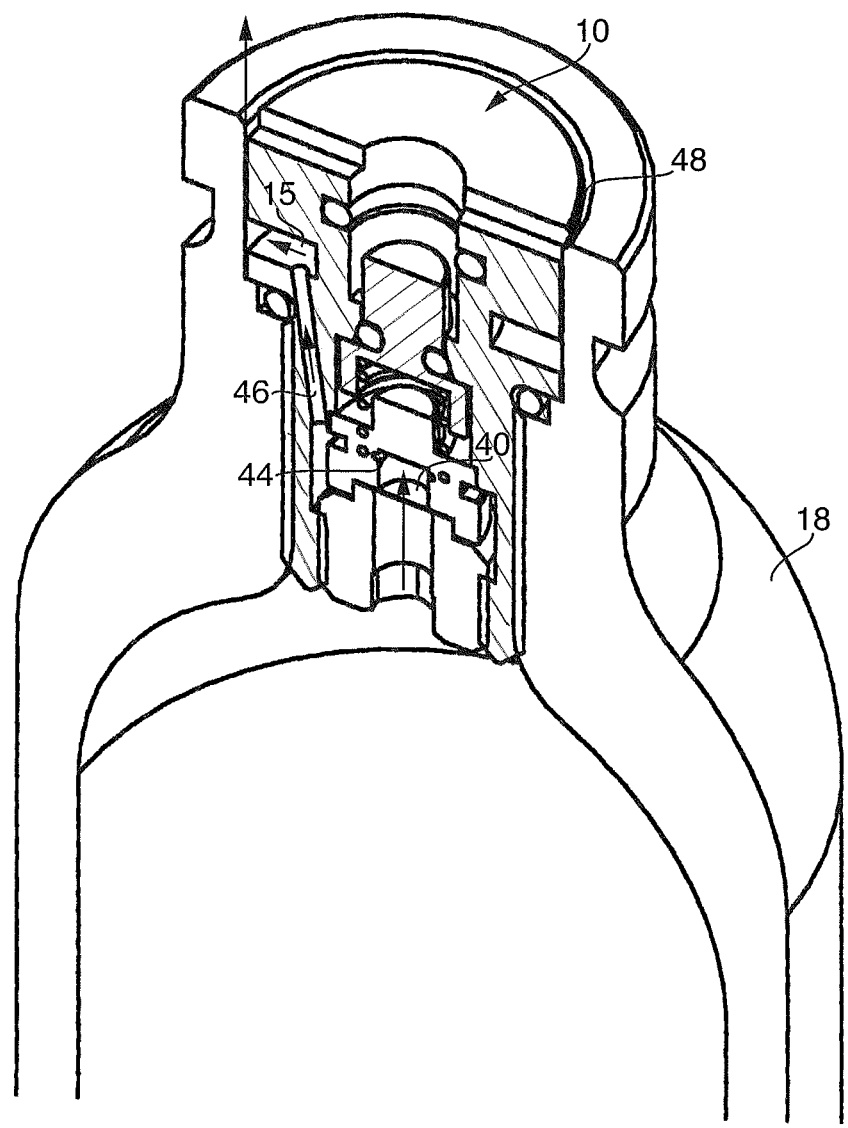
FIG. 5 is a cross-sectional, perspective view of the valve assembly of FIG. 1 installed in the neck of a compressed air cartridge and illustrating an over-pressure fluid flow path.
Figure 6:
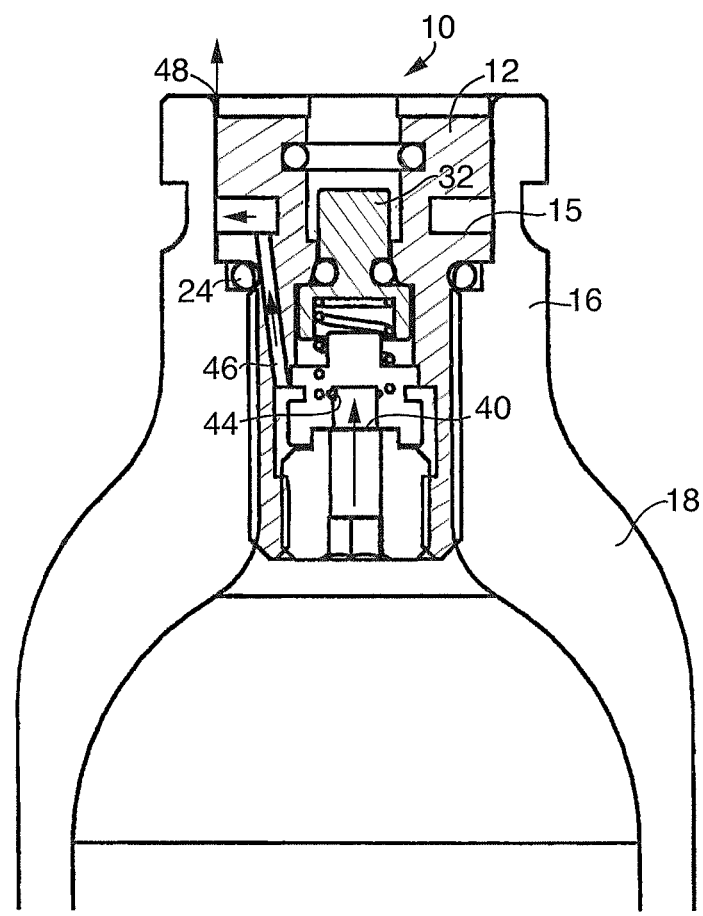
FIG. 6 is cross-sectional, front view of the valve assembly of FIG. 1 installed in the neck of a compressed air cartridge and illustrating the over-pressure fluid flow path.

Turning now to FIGS. 5 and 6, an over-pressure fluid flow path is illustrated by the arrows. As shown therein, during normal operation, compressed air is prevented from traveling straight up the throughbore 20 from the bottom of the valve assembly 10 by the presence of burst disc 40. In the event that the pressure within the cartridge 18 exceeds a predetermined, allowable pressure, however, the burst disc 40 will rupture or burst, allowing the compressed air to pass through the disc 40. The over-pressure compressed air then flows through a radial hole 44 above the burst disc 40, through an angled side channel 46 formed in the valve assembly 10 and to an outlet in groove 15. Importantly, the head portion 12 of the valve assembly is not in direct contact with the inner walls of the neck 16 of the cartridge 18. In particular, there is a circumferential clearance 48 between the inner walls of the neck 16 and the head portion 12 of the valve assembly through which the compressed air may exit the cartridge 18. In the preferred embodiment, the circumferential clearance 48 is approximately 0.5 millimeters.

As will be readily appreciated by one of ordinary skill in the art, the burst disc 40 provides an important safety feature in that it ensures that excess or unsafe pressures within the cartridge 18 are alleviated or prevented altogether. In particular, the burst disc 40 is designed to burst at a certain predetermined pressure in order to ensure that the pressure within the cartridge 18 does not rise to an unsafe level. The burst disc 40 may be manufactured in the form of a thin metal foil, such as aluminum, copper, brass or alloys thereof. In other embodiments, the burst disc 40 may be manufactured from plastic or other materials known in the art. In the preferred embodiment, the burst disc 40 is designed to rupture or burst at approximately 3000 psi, although the burst disc 40 may be designed to burst at other pressures relative to the pressure specifications of the compressed air cartridge 18 without departing from the broader aspects of the present invention.

Importantly, the configuration of the over-pressure flow path, as illustrated in FIGS. 5 and 6, slows down the pressurized air exiting the cartridge 18 in the event of an over-pressure situation. In particular, the over-pressure flow path represented by the arrows includes may turns (such as the right angle turn from just above the burst disc 40 through the radial hole), which function to decrease the velocity of the gas as it escapes, which is desirable from a safety perspective.

Notably the radial hole 44 of the over-pressure fluid flow path is positioned below the radial aperture 42 of the normal fluid flow path. As will be readily appreciated, the over-pressure fluid flow path and the normal fluid flow path are entirely isolated from one another.

As noted above, importantly, the blood grooves 28 of the valve assembly 10 form a part of the normal fluid flow pathway, provided a guiding pathway to the radial apertures 42, as well as provide a safety mechanism to quickly relieve pressure within the cartridge 18 when the valve assembly 10 is removed from the cartridge 18.

While the preferred embodiment of the present invention contemplates use of the valve assembly 10 with a $CO_2$ cartridge of a carbonated beverage making appliance, the present invention is not so limited in this regard. In particular, the present invention contemplates use of the valve assembly 10 with any container containing a volume of compressed air of any type. In addition, the valve assembly of the present invention is not intended to be limited to controlling the flow of compressed air, but is also intended to control the flow of fluids, generally.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of this disclosure.

What is claimed is:

1. A valve assembly for a compressed air cartridge, comprising:
   a body portion;
   a head portion integrally formed with said body portion;
   a throughbore extending axially through said head portion and said body portion;
   a primary fluid flow path within said valve assembly, said primary fluid flow path being configured to provide for controlled exit of a fluid from said cartridge;
   a secondary fluid flow path within said valve assembly;
   an over-pressure relief mechanism for controlling a flow of said fluid through said secondary fluid flow path when a pressure within said cartridge exceeds a predetermined level;
   a circumferential groove formed in said head portion; and
   an outlet aperture formed in said circumferential groove, said outlet aperture being in fluid communication with said secondary fluid flow path.

2. The valve assembly according to claim 1, wherein:
   said secondary fluid flow path includes a radial channel and an angled side channel extending from said throughbore to said outlet aperture in said circumferential groove.

3. The valve assembly according to claim 1, wherein:
   said over-pressure relief mechanism includes a fracturable seal element configured to burst at a predetermined pressure.

4. The valve assembly according to claim 3, wherein:
   said fracturable seal element is a metal foil.

5. The valve assembly according to claim 1, further comprising:
   a poppet positioned within said throughbore, said poppet including a stem, a spring and a seal ring;
   wherein said poppet is biased by said spring to a first position in which said seal ring is pressed against a tapered section of said throughbore to prevent an egress of said fluid from said cartridge through said primary fluid flow path; and
   wherein said poppet is movable against said spring bias to a second position in which said seal ring is moved out of contact with said tapered section of said throughbore to permit said egress of said fluid from said cartridge through said primary fluid flow path.

6. The valve assembly according to claim 1, wherein:
   said body portion includes a pair of vertically extending grooves on opposing sides of said body portion.

7. The valve assembly according to claim 6, further comprising:
   at least one radial aperture formed in said grooves, said at least one radial aperture permitting a flow of said fluid from said cartridge and into said valve assembly.

8. The valve assembly according to claim 1, wherein:
said primary fluid flow path and said secondary fluid flow path are fluidly isolated from one another.

* * * * *